United States Patent
Escobar

(10) Patent No.: US 10,670,436 B2
(45) Date of Patent: Jun. 2, 2020

(54) METHODS AND SYSTEMS OF FLUID FLOW RATE MEASUREMENT BASED ON MAGNETIZATION

(71) Applicant: Saudi Arabian Oil Company, Dhahran (SA)

(72) Inventor: Juan D. Escobar, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 176 days.

(21) Appl. No.: 16/000,566

(22) Filed: Jun. 5, 2018

(65) Prior Publication Data
US 2019/0368906 A1 Dec. 5, 2019

(51) Int. Cl.
*G01F 1/58* (2006.01)
*G01F 1/60* (2006.01)

(52) U.S. Cl.
CPC .............. *G01F 1/588* (2013.01); *G01F 1/60* (2013.01)

(58) Field of Classification Search
None
See application file for complete search history.

(56) References Cited

U.S. PATENT DOCUMENTS

| | | | |
|---|---|---|---|
| 4,782,295 A | 11/1988 | Lew | |
| 5,388,465 A | 2/1995 | Okaniwa et al. | |
| 6,046,587 A | 4/2000 | King et al. | |
| 6,452,390 B1 | 9/2002 | Wollin | |
| 6,736,978 B1 * | 5/2004 | Porter | G01F 1/708 210/222 |
| 7,180,288 B2 | 2/2007 | Scheven | |
| 7,378,845 B2 | 5/2008 | Morris et al. | |
| 7,574,924 B1 | 8/2009 | Feller | |
| 7,852,074 B2 | 12/2010 | Edwards | |
| 7,877,220 B2 | 1/2011 | Wray | |
| 8,729,893 B2 | 5/2014 | Li et al. | |

(Continued)

FOREIGN PATENT DOCUMENTS

| | | |
|---|---|---|
| GB | 969203 A | 9/1964 |
| RU | 2135960 C | 8/1999 |

(Continued)

OTHER PUBLICATIONS

International Search Report and Written Opinion for related PCT application PCT/US2019/035629 dated Oct. 4, 2019.

*Primary Examiner* — Harshad R Patel
(74) *Attorney, Agent, or Firm* — Bracewell LLP; Constance Gall Rhebergen

(57) ABSTRACT

Provided here are systems and methods to determine the flow rate of fluids that have magnetizable components. One such flow rate measurement apparatus contains a magnetization unit that magnetizes fractions of magnetizable components present in the fluid; a magnetic field detector with a probe to detect the magnetic field associated with the magnetized fractions of the fluid; and a processing circuitry to determine velocity of the fluid from time taken for the magnetized fractions to travel from the magnetization unit to the magnetic field detector and the distance between the magnetization unit and the magnetic field detector. Flow rate of the fluid is then subsequently determined from the velocity and the cross-sectional area of the conduit of the flow measurement apparatus. Various other embodiments may be disclosed and claimed.

10 Claims, 10 Drawing Sheets

(56) References Cited

U.S. PATENT DOCUMENTS

| | | |
|---|---|---|
| 9,316,514 B2 | 4/2016 | Smith et al. |
| 9,335,195 B2 | 5/2016 | Ong et al. |
| 9,651,411 B2 | 5/2017 | Yamaguchi et al. |
| 9,696,188 B2 | 7/2017 | Rogers et al. |
| 9,759,590 B2 | 9/2017 | Florin et al. |
| 2013/0055789 A1 | 3/2013 | Targosz |
| 2017/0000375 A1* | 1/2017 | Demas ................ A61B 5/05 |

FOREIGN PATENT DOCUMENTS

| | | |
|---|---|---|
| WO | 2012034874 A2 | 3/2012 |
| WO | 2012054151 A2 | 4/2012 |

\* cited by examiner

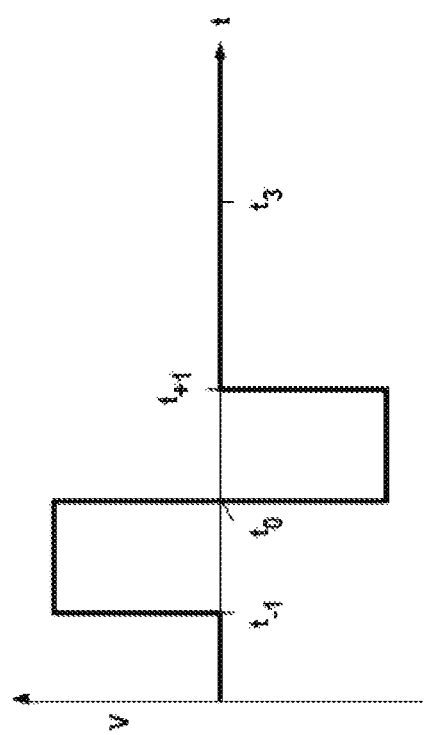

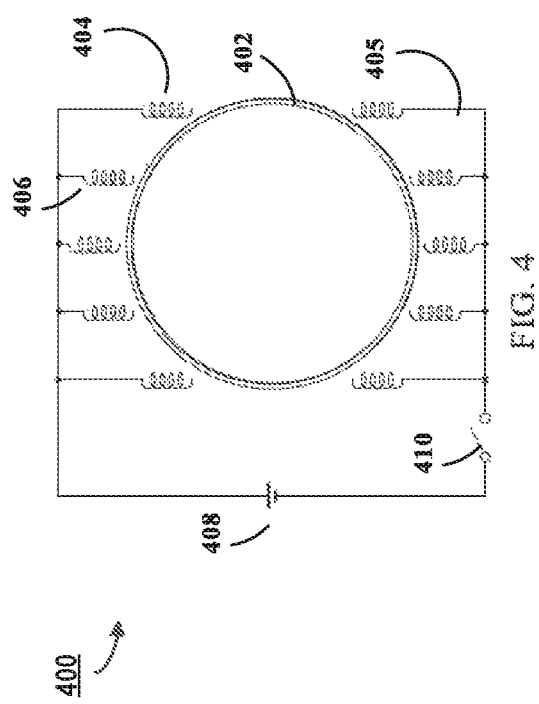

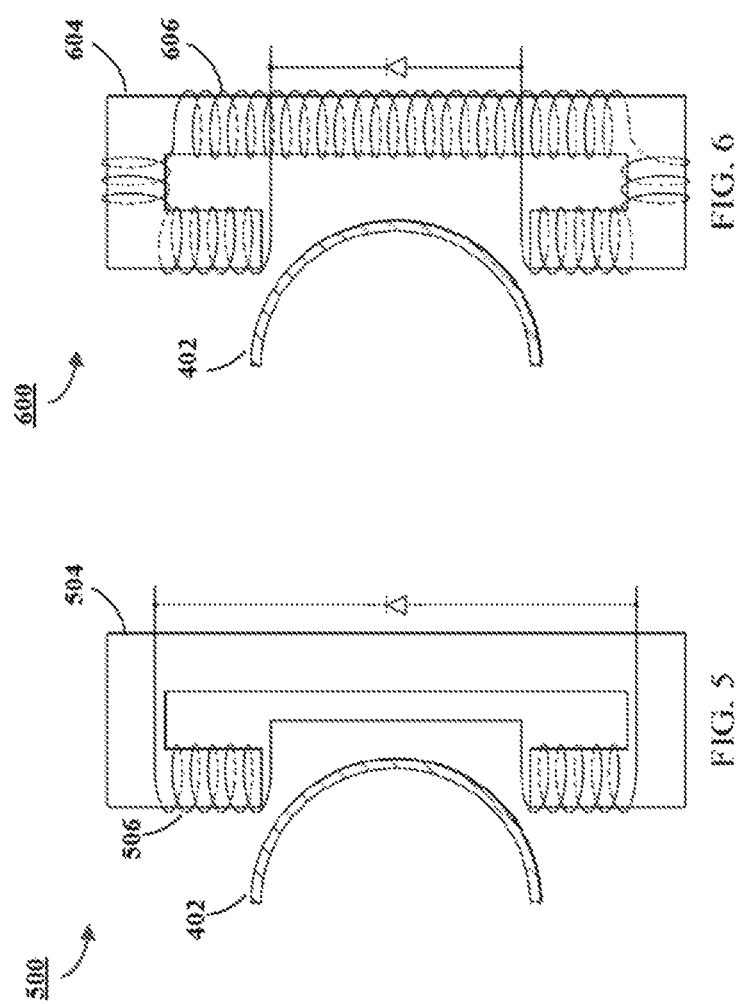

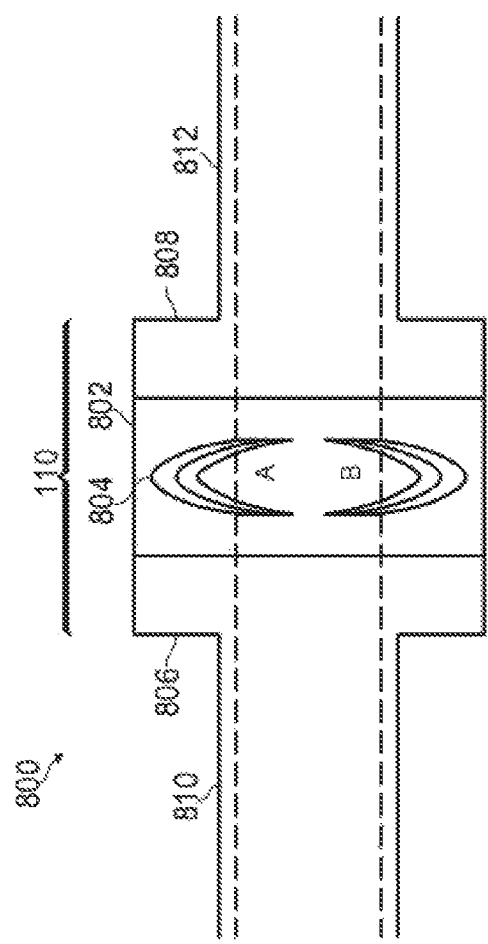

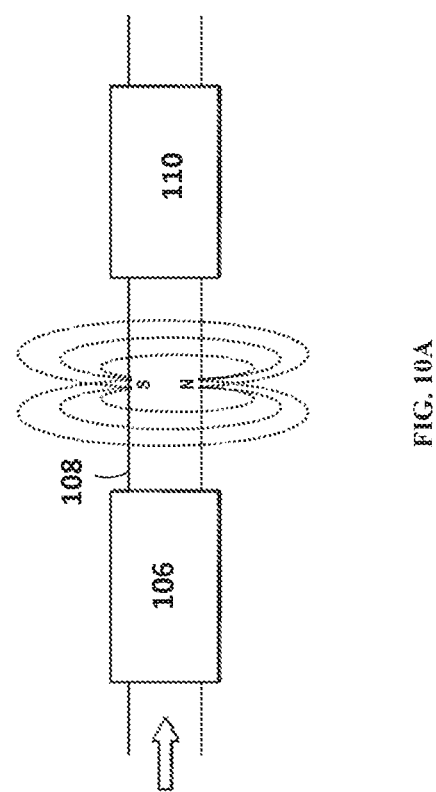

METHODS AND SYSTEMS OF FLUID FLOW RATE MEASUREMENT BASED ON MAGNETIZATION

TECHNICAL FIELD

The disclosure relates to flow meters for measuring flow rate of fluids containing magnetizable components.

BACKGROUND

Current methods for measuring flow of fluids include mechanical flow meters, electromagnetic flow meters, ultrasonic meters, Coriolis meters, vortex meters, and other meters. The mechanical flow meters have moving parts that are placed in the path of a fluid flow and the movement of these parts is used to determine the flow rate. For example, a turbine meter has blades configured to rotate at a given speed for a given flow velocity. Any mechanical wear affects the performance of these meters, thus necessitating increased maintenance checks and costs for systems using the mechanical flow meters. The magnetic-inductive flow meters are based on Faraday's law of induction and include a transmitter and sensor to measure flow of a fluid through a pipe. When the fluid flows through a magnetic field, an electromotive force proportional to the velocity of the flow is generated between the pair of electrodes, which is perpendicular to the flow direction and the magnetic field. The sensor is placed inline and measures this induced voltage generated by the fluid. This voltage increases or decreases based on velocity. The transmitter receives the voltage and converts it into a flow measurement. These flowmeters are not suitable for low velocity flow of fluids and are only suitable for fluids having conductivity of 5 microsiemens per centimeter or greater. Therefore, these electromagnetic flow meters are not suited for hydrocarbon-based products, gases or steam. With hydrocarbon-based products, there is insufficient conductivity present for an electromagnetic flow meter to function.

SUMMARY

In consideration of the above-identified shortcomings of the art, methods and systems for flow rate measurements are disclosed here. Disclosed here is a flow rate measurement apparatus. The apparatus includes a magnetization unit containing a first conduit for conveying a stream of a magnetizable fluid and an inductor arranged on an exterior surface of the first conduit and operable to magnetize fractions of magnetizable components present in the magnetizable fluid. The first conduit is made of material with low magnetic permeability that is pervious to the magnetic flux. The apparatus also includes a second conduit coupled downstream to the magnetization unit for conveying the stream of the magnetizable fluid containing magnetized fractions to a magnetic field detector; and the magnetic field detector containing a third conduit for receiving the stream of the magnetizable fluid from the second conduit and a probe placed inside the third conduit for detecting a magnetic field associated with the magnetized fractions of the magnetizable fluid. The third conduit is made of material with low magnetic permeability that is pervious to the magnetic flux. In certain embodiments, the probe can be embedded in the inner surface of the third conduit. The apparatus also includes a processing circuitry to determine velocity of the magnetizable fluid from time taken for the magnetized fractions to travel from the magnetization unit to the magnetic field detector and the distance between the magnetization unit and the magnetic field detector.

In an embodiment, the flow rate measurement apparatus is coupled to a piping system for transport of the magnetizable fluid. In an embodiment, the first conduit, the second conduit, and the third conduit are mechanically coupled to provide for an unobstructed flow of the magnetizable fluid. In an embodiment, the magnetizable fluid is a hydrocarbon containing fluid. In an embodiment, the magnetizable components are water and black powder. In an embodiment, the magnetizable fluid is an aqueous fluid containing iron compounds.

Disclosed here is a method for measuring flow rate of a magnetizable fluid flowing through a piping system. The method includes conveying the magnetizable fluid through a first conduit of a magnetization unit; applying, by the magnetization unit, a plurality of magnetic pulses at predetermined intervals of time to the magnetizable fluid to magnetize fractions of magnetizable components present in the magnetizable fluid; conveying the magnetizable fluid with the magnetized fractions from the magnetization unit through a second conduit to a magnetic field detector situated downstream of the magnetization unit at a prefixed distance; and detecting a magnetic field from the magnetized fractions of the magnetizable fluid by the magnetic field detector. The method further includes determining velocity of the magnetizable fluid by acquiring time taken for the magnetized fractions to travel from the magnetization unit to the magnetic field detector and the prefixed distance between the magnetization unit and the magnetic field detector. The method further includes calculating a flow rate of the magnetizable fluid from the velocity of the magnetizable fluid and cross-sectional area of the second conduit. In an embodiment, the first conduit and third conduit are made of materials with low magnetic permeability that are pervious to the magnetic flux. In an embodiment, the magnetizable fluid is a hydrocarbon containing fluid. In an embodiment, the magnetizable components are water and black powder. In an embodiment, the magnetizable fluid is an aqueous fluid containing iron compounds.

BRIEF DESCRIPTION OF THE DRAWINGS

Embodiments will be readily understood by the following detailed description in conjunction with the accompanying drawings. Embodiments are illustrated by way of example and not by way of limitation in accompanying drawings.

FIG. 3 is a timing chart demonstrating the magnetic signal processing operation, according to an embodiment.

FIG. 4 is a diagrammatic representation of a radial cross-sectional view of a magnetization unit, according to an embodiment.

FIG. 5 is a diagrammatic representation of an electromagnetic coil arrangement, according to an embodiment.

FIG. 6 is a diagrammatic representation of an electromagnetic coil arrangement, according to an embodiment.

FIG. 8 is a diagrammatic representation of a magnetic field detector, according to an embodiment.

FIG. 10A is a diagrammatic representation of a piping system equipped with a flow rate measurement apparatus, following the generation of a magnetic flux, according to an embodiment.

DETAILED DESCRIPTION

Figure 1:
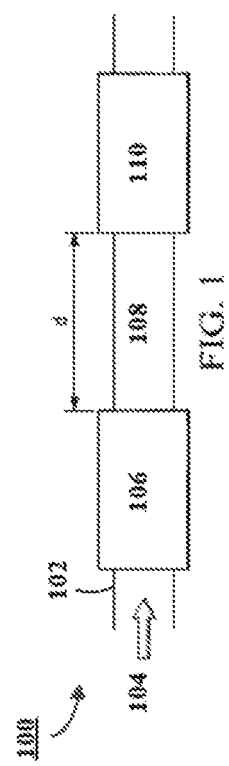
FIG. 1 is a diagrammatic representation of a piping system equipped with a flow rate measurement apparatus, according to an embodiment.

The present disclosure describes flow rate measurement apparatuses and the methods of using these apparatuses for the measurement of flow rate of fluids. One embodiment includes a piping system equipped with a flow rate measurement apparatus. This piping system has several conduits coupled to one another. In an embodiment, the flow rate measurement apparatus contains three conduits. The apparatus includes a magnetization unit containing a first conduit for conveying a fluid stream and an inductor arranged on an exterior surface of the first conduit and operable to magnetize fractions of magnetizable components present in the fluid. In an embodiment, the first conduit is made of material with low magnetic permeability that is pervious to the magnetic flux. The apparatus also includes a second conduit coupled downstream to the magnetization unit for conveying the stream of fluid containing magnetized fractions to a magnetic field detector; and the magnetic field detector containing a third conduit for receiving the fluid stream from the second conduit and a probe placed inside the third conduit for detecting a magnetic field associated with the magnetized fractions of the fluid. In certain embodiments, the third conduit is made of material with low magnetic permeability that is pervious to the magnetic flux. In certain embodiments, the probe can be embedded in the inner surface of the third conduit. The apparatus also includes a processing circuitry to determine velocity of the magnetizable fluid from time taken for the magnetized fractions to travel from the magnetization unit to the magnetic field detector and the distance between the magnetization unit and the magnetic field detector. Based on determined velocity, the flow rate is calculated as the product of the velocity and the area of the cross-sectional area of the applicable sections of the piping system.

In an embodiment, the fluid is a hydrocarbon containing fluid. In certain embodiments, the magnetized fraction are fractions of water and black powder of the hydrocarbon-containing fluid. In an embodiment, the piping system can be used for transport of hydrocarbons from a production site to a processing site or from one processing site to another or from one plant to another within a processing site such as inside a refinery. In an embodiment, the fluid is an aqueous fluid containing iron compounds. Such aqueous fluids can be fluids supplied to or removed from chemical processing units. The first conduit, the second conduit, and the third conduit are mechanically coupled to provide for an unobstructed flow of the magnetizable fluid through the piping system.

Disclosed here are also embodiments of methods for measuring flow rate of a magnetizable fluid flowing through a piping system. One such method includes the steps of conveying a fluid through a first conduit of a magnetization unit. The method further includes applying by the magnetization unit a plurality of magnetic pulses at pre-determined intervals of time to the fluid to magnetize fractions of the magnetizable components in the magnetizable fluid. In an embodiment, fractions of the water and black powder present in a hydrocarbon-containing fluid are magnetized. The fluid with the magnetized fractions is then conveyed from the magnetization unit through a second conduit to a magnetic field detector situated downstream of the magnetization unit at a prefixed distance. The magnetic field detector detects the magnetic field from the magnetized fractions of the fluid. Finally, the velocity is determined by a processing circuitry by acquiring time taken for the magnetized fractions to travel from the magnetization unit to the magnetic field detector and the prefixed distance between the magnetization unit and the magnetic field detector.

In the following description, numerous details are set forth in order to provide a thorough understanding of the various embodiments. In other instances, well-known processes, devices, and systems may not been described in particular detail in order not to unnecessarily obscure the various embodiments. Additionally, illustrations of the various embodiments may omit certain features or details in order to not obscure the various embodiments.

In the following detailed description, reference is made to the accompanying drawings that form a part of this disclosure. Like numerals may designate like parts throughout the drawings. The drawings may provide an illustration of some of the various embodiments in which the subject matter of the present disclosure may be practiced. Other embodiments may be utilized, and logical changes may be made without departing from the scope of this disclosure.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

Disclosed here are systems and methods of determining the flow rate of a fluid flowing through a conduit by magnetizing certain components of the fluid at a known distance upstream of a magnetic field detector. The magnetization unit contains electromagnets. Systems and methods disclosed here do not measure electric field strength; instead, they are based on detection of the magnetized components in the fluid. The velocity of the fluid in the conduit is determined by the time travelled by the magnetized components in the fluid from a magnetization unit to a downstream detection unit and the distance between these units.

The sensitivity of the systems and methods here are impacted by the low conductivity of magnetizable fluids. When the flow meters described herein are utilized in piping systems transporting hydrocarbons, fractions of water, black powder, and other magnetizable components are magnetized. For example, as per the definition from the American Petroleum Institute (API) of dry sales gas, it can have up to 7 pounds of water for million standard cubic feet. Black powder results from both chemical and bacterial reactions within the magnetizable fluids. Black powder is a mixture of iron-based compounds with other compounds. In an embodiment, the black powder is composed of iron (49 weight percent (wt %)), sulfur (29 wt %), chromium (0.2 wt %), manganese (0.2 wt %), nickel (0.2 wt %), calcium (0.1 wt %), zinc (<0.1 wt %). The iron-based compounds can include $FeS_2$ (54.2 wt %) and $Fe_2O_3$ (45.8 wt %).

Disclosed here are systems and methods of measuring the velocity of single-phase magnetizable fluid in a pipeline by magnetizing certain fluid components at a known distance upstream of a magnetic field detector. Velocity is obtained by measuring the time it takes for the magnetized molecules to travel from the magnetization unit to the magnetic field detector and the known distance between the magnetization unit and the magnetic field detector. In an embodiment, the magnetizable fluid is a hydrocarbon-containing fluid that contains water, black powder, and other components that can be magnetized. To magnetize these components of the magnetizable fluid, it is necessary to create a strong magnetic field. The magnetization unit generates a magnetic field strong enough to magnetize these components of this magnetizable fluid with the strength necessary to keep them magnetized until they are detected downstream at a known distance "d".

FIG. 1 is a diagrammatic representation of a piping system 100 equipped with a flow rate measurement apparatus. This piping system 100 has several conduits coupled to one another. The pipe 102 conveys a magnetizable fluid stream 104 to a magnetization unit 106. This magnetization unit 106 has a first conduit for receiving the magnetizable fluid flow from pipe 102 and electromagnetic coils arranged on an exterior surface of the first conduit that are operable to magnetize fractions of the magnetizable fluid. The piping system includes a second conduit 108 downstream to the magnetization unit 106 for conveying the magnetizable fluid flow to a magnetic field detector 110. In an embodiment involving transport of hydrocarbon fluids, the magnetizable fluid containing magnetized fractions of water and black powder is conveyed via the second conduit 108 to a magnetic field detector 110. The second conduit 108 is made of materials with greater magnetic permeability as compared to the conduits inside the magnetization unit 106 and the magnetic field detector 110. The magnetic field detector 110 includes a third conduit for receiving the magnetized fluid flow from the second conduit 108 and a probe placed inside the third conduit for detecting a magnetic field associated with the magnetized fractions of the magnetizable fluid. In certain embodiments, the probe can be embedded in the inner surface of the third conduit. In an embodiment, the pipes and second conduit are made of carbon steel. In an embodiment, the first and third conduits are made of material with low magnetic permeability that is pervious to the magnetic flux, such as plastic. In an embodiment, the first and third conduits are about fifteen centimeters long. The piping system 100 also includes a processing circuitry to determine velocity of the magnetizable fluid from the time taken for the magnetized fractions of water and black powder to travel from the magnetization unit 106 to the magnetic field detector 110 and the distance (d) between the magnetization unit 106 and the magnetic field detector 110. The flow rate measurement apparatus includes the magnetization unit 106, the magnetic field detector 110, and a flow processing circuitry.

Figure 2:
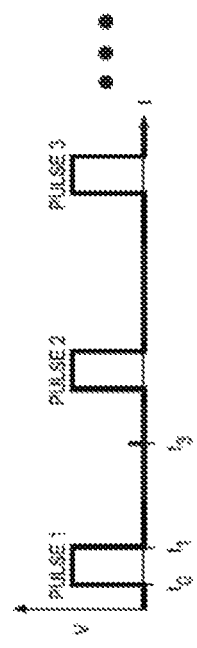
FIG. 2 is a timing chart demonstrating the magnetic signal processing operation, according to an embodiment.

FIG. 2 is a timing chart of the driving voltage pulses generated at pre-determined intervals of time by a magnetization unit 106 that contains electromagnets, according to an embodiment. Fractions of water, black powder, and other components present in the magnetizable fluid are magnetized by the magnetization unit 106 by delivery of Pulse 1 from time $t_0$ to $t_1$. Magnetized components will be detected by the magnetic field detector 110 at time $t_3$ ($t_3 > t_1 > t_0$). The velocity (v) of the fluid will be calculated by the use of the following equation:

$$v = d/(t_3 - t_1) \quad \text{[Equation 1]}$$

The subsequent periodic pulses, such as Pulse 2 and Pulse 3 of FIG. 2, are continuously generated to magnetize fractions in the magnetizable fluid as it flows through the magnetization unit 106. For example, fractions of water, black powder, and other components present in a hydrocarbon fluid can be magnetized. In certain embodiments, the pulses are generated at regular intervals of time as indicated by Pulse 1, Pulse 2, and Pulse 3 in FIG. 2. Each pulse initiates a measurement cycle that is initiated only after the magnetized molecules are detected at time $t_3$. When the fractions of water, black powder, and other components magnetized by Pulses 2 and 3 flow through the magnetic field detector 110, additional data points of the flow rate are collected and analyzed.

In certain embodiments, additional discrimination can facilitate the detection of the magnetized components at time $t_3$. FIG. 3 is a timing chart of the voltage pulses generated at pre-determined intervals of time by an electronics system controlling a magnetization unit 106 that contains electromagnets. For example, it may be necessary to change the polarity of the voltage at $t_0$ to change the direction of the magnetic flux and the magnetization of the molecules. The voltage used to energize the magnetization unit may follow a pattern like the one indicated in FIG. 3.

Methods disclosed here include generating a distinct pattern to facilitate the magnetic field detector to detect the magnetized components at $t_3$. The magnetization unit 106 produces a strong magnetic field that forces protons of certain components in the magnetizable fluid to align with the magnetic field. Magnetization time ($t_1-t_0$ in FIG. 2 or $t_{+1}-t_{-1}$ in FIG. 3) is usually short so only a fraction of the magnetizable fluid is magnetized. The times $t_1$, $t_0$, $t_{-1}$, and $t_3$ are configured depending on the physical dimensions of the magnetic detector, such as its length and radius, and characteristics and components of the magnetizable fluid. A smaller fraction leads to better resolution during detection, thus increasing accuracy of the measurement. But below a certain threshold of the amount of magnetizable components, there would be minimum conductivity in the magnetizable fluid and magnetization and detection would not be possible.

In certain embodiments, the magnetization unit contains electromagnets. In an embodiment, the strong magnetic field is created with an array of coils. FIG. 4 is a diagrammatic representation of a radial cross-sectional view of a magnetization unit 400. This magnetization unit 400 has a conduit 402 for receiving the magnetizable fluid flow and electromagnetic coils, arranged on an exterior surface of the conduit 402. The conduit 402 is made of material with low magnetic permeability that is pervious to the magnetic flux. Coil turns, such as 404 and 405, are part of the same coil wound around the conduit.

The array of coils is connected to an adjustable power supply 408 and a switch 410. In this embodiment, the coils, such as 404, 405, and 406, are made out of insulated wire wrapped around an iron core forming electromagnets. When the switch 410 is turned on, the electromagnets produce a magnetic field across the pipe. Also, the direction of the magnetic flux can be reversed by inverting the polarity of the power supply 408 to generate voltage pulses as shown in FIG. 3. In this embodiment, the array of coils is arranged around the conduit 402 such that the magnetic field crosses the fluid at a 90° angle. The current in the coil of wire generates a counter electromotive force that opposes the current. The relation of this counter voltage to the current is the origin of the concept of inductance (L). The relation is given in Equation 4. If a pure inductance is assumed, the value of R in Equation 4 becomes zero and the voltage is related to the current as the inductance (L) times the rate of change of the current.

Magnetization units can include different types of electromagnetic coil arrangements or inductors. FIG. 5 is a diagrammatic representation of an electromagnetic coil arrangement 500 around a conduit 402 operable for conveying the magnetizable fluid through it. The conduit 402 is made of material with low magnetic permeability that is pervious to the magnetic flux. The core 504 that is wrapped by a conductor 506 forms an inductor. This inductor is installed transversely to the direction of the magnetizable fluid flow through the conduit 402 as shown in FIGS. 4 and 5. In an embodiment, the conduit 402 is installed between two pipe flanges of the upstream and downstream pipes. The pipes can be made of carbon steel. The fluid is conveyed from an upstream pipe, through the conduit of the magnetization unit, and then to a downstream pipe. In the embodiment shown in FIG. 5, a single conductor coil 506 is wrapped around two ends of the core 504 with a gap in the middle.

FIG. 6 is a diagrammatic representation of an electromagnetic coil arrangement 600 around a conduit 402 operable for conveying the magnetizable fluid through it. The conduit 402 is made of material with low magnetic permeability that is pervious to the magnetic flux. The core 604 that is wrapped by a conductor 606 forms an inductor. In this embodiment in FIG. 6, a single conductor coil 606 is wrapped all around the core 604. In this embodiment, the copper wire forming the conductor coil is wrapped from the upper to the lower sections of the core. Increasing the number of turns of the conductor coils increases the magnetic flux for the same current intensity while decreasing the wire gauge of the conductor wire allows for an increase of the intensity of the current, which in turn increases the strength of the magnetic flux as explained by Equation 2.

The magnetomotive force expressed in ampere-turns is the product of the number of turns in the coil (N), and the current in the coil (I), as shown in Equation 2. In an embodiment, a large wire gauge with greater number of turns around the core is used to increase the magnetomotive force (NI). The size of the pipe also affects the strength of the magnetomotive force (NI) as a pipe with a larger diameter will allow for a larger core with greater number of turns of the conductor. The magnetic field created by an electromagnet is directly proportional to N, I, and the permeability, μ. The magnetic field is inversely proportional to the length of the core (Lcore) and the length of the gap (Lgap). The array of electromagnets is installed transversely across the pipe. The magnetomotive force, NI is given by the following equation:

$$NI = B\left(\frac{Lcore}{\mu} + \frac{Lgap}{\mu o}\right)$$ [Equation 2]

Where:
μ=Permeability
$\mu_0$=Permeability of free space
N=Number of turns
I=Current Intensity
Lcore=Coil Length. The length of the inductor is not the length of the wire. The length of the inductor is the length of the wrapped iron core.
Lgap=Distance between the ends of the core
B=Magnetic field or the magnetic flux density The permeability (μ) refers to the ability of a material to support the formation of a magnetic field within itself. As in Equation 2, the magnetic field B is directly proportional to the permeability—a higher permeability, a higher magnetic field. The permeability of the iron core is higher than the permeability of the air and increases the strength of the magnetic field to thousands of times the strength of the magnetic field of the coil alone. This is due to the high magnetic permeability of the core material. The turns around the iron core can be constructed one over the others and the number of turns is only capped by the size of the iron core and the increasing weight of the electromagnet. I refers to the current intensity and is controlled by the operator of the electromagnets. The intensity of the current is capped by the wire gauge of the insulated wire around the iron core. A real inductor can be represented as the series connection of an ideal inductor and a resistor. When a battery is connected to a series resistor and inductor, the inductor resists the change in current and the current therefore builds up slowly. The amount of impedance to the buildup of current is proportional to the rate of change of the current. The current builds up toward the value it would reach with the resistor alone because once the current is no longer changing, the inductor offers no impedance. The current in a coil is given by equation 3.

$$I = \frac{V}{R}\left(1 - e^{\frac{-Rt}{L}}\right)$$ [Equation 3]

Where:
I=Current intensity
V=DC voltage applied by the variable power supply
R=Insulated wire resistance. R is a function of the wire's length and wire gauge. The longer the wire, the greater is the resistance;
the smaller the wire gauge, the lower is the resistance.
t=Refers to the length of time the voltage V is applied to the electromagnet. $t=t_1-t_0$
L=Coil inductance.

Figure 7:
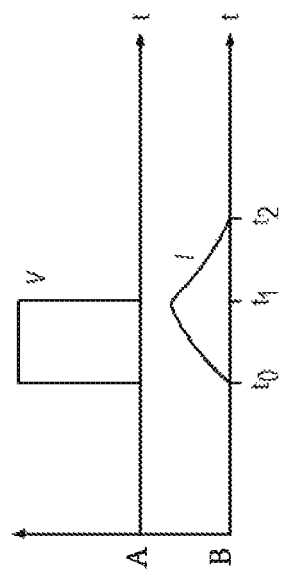
FIG. 7 is a diagrammatic representation of the current (Line B) flowing through the electromagnet during the same interval shown in the timing chart of a single voltage pulse of FIG. 2 and shown here as Line A, according to an embodiment.

Line B in FIG. 7 is a diagrammatic representation of the current flowing through the electromagnet during the same interval shown in the timing chart of a single voltage pulse of FIG. 2 and shown here as Line A. When the voltage is applied to the electromagnet during a time interval t ($t_1-t_0$), the current through the electromagnet ramps up and down as indicated by Line B in FIG. 7. The current I ramps up and down before reaching the steady value of V/R as the time interval $t_1-t_0$ is set short enough so it does not reach it. The voltage/current relationship in a coil is given by Equation 4:

$$V = IR + L\frac{dI}{dt}$$ [Equation 4]

Where V, I, R, L, and t are defined as in Equation 3.

The inductor resists the change in current. If the voltage applied to a coil is removed at $t_1$ as indicated by Line A in FIG. 7, the current will keep running through the freewheeling diode (see FIGS. 5 and 6). Without the freewheeling diode, the current would be forcefully interrupted creating a high $\frac{dI}{dt}$.

From Equation 4, a high $\frac{dI}{dt}$, creates a high voltage across the inductance. The high voltage may be harmful to the operators of the equipment and may eventually damage the switch (FIG. 4). The freewheeling diode allows for the current to ramp down as indicated Line B in FIG. 7. All electromagnets are energized using the same voltage as provided by the adjustable power supply 408 in FIG. 4. The pattern of voltage pulses followed by the power supply can be similar to as the ones indicated by FIG. 2 or 3, or any other pattern that helps the magnetic field detector to detect the magnetization induced in the magnetizable fluid during $t_2$-$t_0$ (FIG. 7). The intensity of the current is capped by the wire gauge of the insulated wire around the core due to the resistance associated to the wire. The resistance generates heat that can be controlled to have a higher current intensity. In certain embodiments, voltages do not exceed 100 Volts direct current and currents are not greater than 250 milliamperes (mA). In other embodiments, the magnetization unit can include other ways of magnetizing fractions of the magnetizable fluid, such as superconductors. The magnetization unit can also include refrigerants to cool the coils.

FIG. 8 is a diagrammatic representation of a piping system 800 fitted with magnetic field detector 110. In this embodiment, the magnetic field detector 110 includes a conduit 802 for receiving the magnetizable fluid flow from the magnetization unit and a set of wires 804 A and B placed inside the conduit 802 for detecting a magnetic field associated with the magnetized fractions of the magnetizable fluid, such as the magnetized fractions of water and black powder of a hydrocarbon-containing fluid. In an embodiment, the magnetic field detector is installed between two pipe flanges 806 and 808 of the upstream pipe 810 and downstream pipe 812.

Magnetic field detectors can include a probe arranged inside the conduit 802. The conduit 802 is made of material with low magnetic permeability that is pervious to the magnetic flux. In certain embodiments, the magnetic field detector may include a shield to deal with the pressure contained in the pipe. The conduit 802, including a shield, if utilized, has to be rated for the pressure in the pipe and also match the rating of the upstream and downstream flanges. Certain embodiments include other methods of detection and measurement such as magnetostriction. If magnetostriction is used, the downstream coil should be permanently energized or equipped with a permanent magnet. In this embodiment, the magnetic field of the magnetized molecules, magnetized during $t_2$-$t_0$, interact with the magnetic field of the permanently-energized electromagnet/magnet at $t_3$, to produce a mechanical torque. This torque causes a sound wave that can be detected. Similar to previous embodiments, $t_3$-$t_1$, is the time travelled by the magnetized molecules from the magnetization unit to the magnetic field detector. And, this travel time is used to calculate velocity (Equation 1). Once the velocity of the fluid is calculated using Equation 1, the volumetric flow rate (Q) at flowing conditions is found by multiplying the velocity of the fluid (v) by the cross-sectional area (A) of the pipe:

$$Q = A \times v \quad \text{[Equation 5]}$$

The flow rate measurement apparatus can include several types of processing circuits. In an embodiment, the electronics includes the following main circuits: (i) a driver for switch, such as 410 depicted in FIG. 4, (ii) a circuit coupled to the magnetic field detector; (iii) a clock to time the time $t = t_3 - t_1$, and (iv) an arithmetic circuit to compute Equations 1 and 5.

Figure 9B:
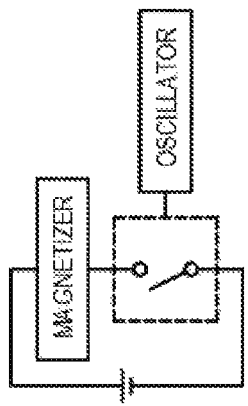
FIGS. 9A and 9B are diagrammatic representations of two arrangements of the magnetizer and the oscillator as part of the magnetization unit, according to an embodiment.
Figure 9A:
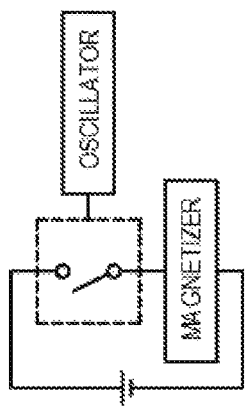

The function of the switch 410 depicted in FIG. 4 is to get the voltage applied to the magnetization unit 400 to generate voltage pulses as shown in FIG. 2. To perform this operation, the switch needs to be closed during a time interval $t = t_1 - t_0$ and remain open until a new cycle starts. The time the switch remains open should be long enough for the magnetized fluid to reach the magnetic field detector at the minimum fluid velocity. FIGS. 9A and 9B are schematic representations of circuits included as part of the magnetization unit of a flow rate measurement apparatus. The switch can be installed in either branch of the circuit, the upper branch as shown in FIG. 9A or the lower branch as shown in FIG. 9B.

In an embodiment, a transistor is used as the switch. There are many kinds of transistors, such as the bipolar junction transistor (BJT) and the field effect transistor (FET). Either a BJT or FET are functional to control the voltage to the magnetization unit. Both of these transistors have 3 leads. The three leads of a BJT are the base, the collector, and the emitter. BJTs can be of two types, NPN or PNP depending on how they are formed. A NPN transistor is formed with a thin layer of p-type semiconductor sandwiched between two n-type semiconductors while a PNP transistor is formed with a thin layer of n-type semiconductor between two p-type semiconductors. In an embodiment, a NPN-type BJT is used in the magnetization unit. The BJT is installed in the location of the switch in FIG. 9A. The lead used to control the BJT is the base. With a properly selected base current $I_b$, the BJT behaves as a close contact. With $I_b=0$, the BJT behaves as an open contact. For example, an oscillator made with a 555-timer integrated circuit provides the current $I_b$. In this application, the 555 functions as an oscillator.

In the oscillator mode, Equation 6 gives the oscillation frequency.

$$f = \frac{1}{\ln(2) * C * (R1 + 2R2)} \quad \text{[Equation 6]}$$

The high time from each pulse is given by:

$$\text{high} = \ln(2) * C * (R1 + R2) \quad \text{[Equation 7]}$$

and the low time from each pulse is given by:

$$\text{low} = \ln(2) * C * R2 \quad \text{[Equation 8]}$$

FIG. 10A is a diagrammatic representation of a piping system equipped with a flow rate measurement apparatus, following the generation of a magnetic flux. During the high time (Equation 7), a current will be induced and will follow the pattern shown by Line B in FIG. 7. The current flows through the magnetization unit 106 to produce a magnetic field across the pipe. The magnetic field will magnetize the fluid molecules to make them to behave as a magnet with the magnetic flux (shown around conduit 108). The magnetized molecules then travel to the magnetic field detector 110. The direction of the magnetic flux is from the magnetic north pole (N) to south pole (S).

Figure 10C:
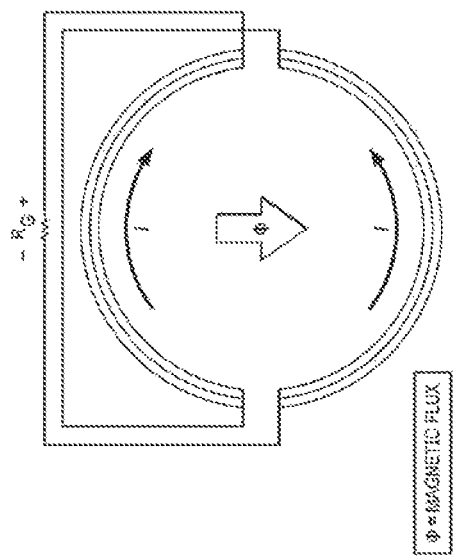
FIGS. 10B and 10C are diagrammatic representations of the radial cross-sectional views of a magnetic field detector, according to an embodiment.
Figure 10B:
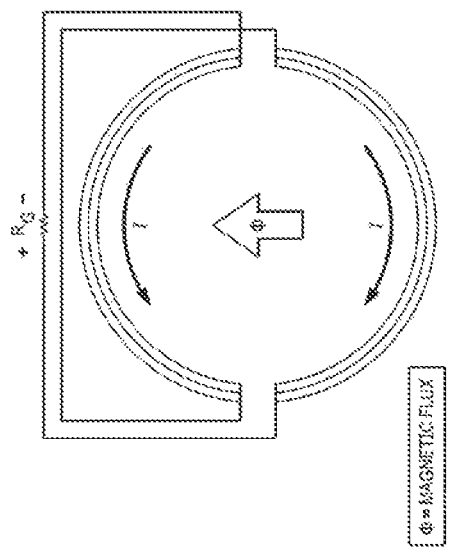
Figure 11:
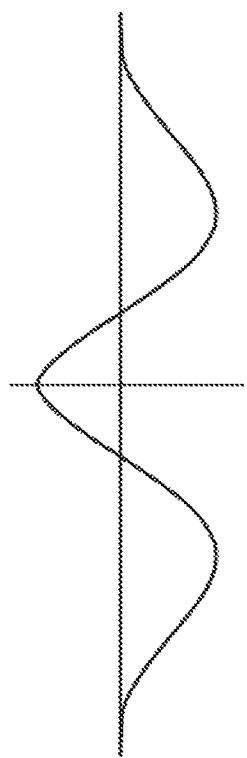
FIG. 11 is a diagrammatic representation of the voltage (or current) across a resistor $R_G$, according to an embodiment.

FIGS. 10B and 10C are diagrammatic representations of the radial cross-sectional views of a magnetic field detector 110. These figures are depictions of the same network (probe) in the magnetic field detector 110 at two different time points. When the magnetized fluid reaches the magnetic field detector 110, it will first sense a magnetic flux (Φ) in the direction indicated by the arrow in FIG. 10B. The moving flux will produce a current in the direction indicated in FIG. 10B. The current will generate a voltage across the resistor $R_G$ with the polarity indicated in FIG. 10B. The magnetized fluid will keep moving across the magnetic field detector and then the direction of the magnetic flux will change by 180 degrees. When this happens, the direction of the current will change as shown in FIG. 10C reverting the voltage's polarity across the resistor $R_G$. Finally, when the back end of the magnetized fluid passes the magnetic field detector, the magnetic flux direction will be as indicated in FIG. 10B again. This will produce a current and a voltage in the direction and polarity as indicated in FIG. 10B. The forces producing the currents through $R_G$ are given by Equation 9. FIG. 11 is a depiction of the voltage (or current) across resistor $R_G$.

In an embodiment, the magnetized fluid magnetic field detector consists of a resistor $R_G$ connected to a network as indicated in FIGS. 10B and 10C and an amplifier. Certain embodiments include an integrated circuit INA118 as an amplifier, which is a precision low power amplifier used in instrumentation applications. The principle of operation of the magnetic field detector is based on the Lorentz Force Law that relates the force exerted upon a charge with the velocity of the magnetic field, the magnetic field, the angle between the magnetic field and the velocity, and the magnitude of the charge itself. Equation 9 gives this relation.

$$\vec{F} = q\vec{v} \times \vec{B} \qquad \text{[Equation 9]}$$

F, v and B are vectors and v×B is the cross product between the vectors v and B. The cross product is defined as the product of the magnitude of vector v times the magnitude of vector B times the sine of the changing angle between these 2 vectors. The force in Equation 9 is excerpted on all free electrons present in the copper winding depicted in FIG. 8 making the electrons to move in the direction of the force. The movement of electrons in the same direction causes an electrical current, measured in Coulombs per second (Amps), to circulate along the wiring and through resistor $R_G$. This current moves through resistor $R_G$ and generates a voltage according to Ohms Law:

$$V = I \times R_G \qquad \text{[Equation 10]}$$

In an embodiment, this voltage is amplified by an INA 18 integrated circuit that is a low power, general purpose instrumentation amplifier offering excellent accuracy. As shown in FIG. 11, there is a peak in the middle of the signal, and the time this peak occurs marks time $t_3$ in Equation 1. In an embodiment, the peak detector is a peak-hold circuit cascaded together with a comparator. For example, the peak detector can be a peak-hold circuit like the LTC6244 followed with a comparator like the LM393. The LTC6244 is a dual high speed, unity-gain stable complementary metal oxide semiconductor operational amplifier. It features a 50 megahertz (MHz) gain bandwidth, 40 volts per microsecond (V/μs) slew rate, and 1 picoAmperes (pA) of input bias current, low input capacitance, and rail-to-rail output swing, respectively. The LM393 is a dual independent precision voltage comparator capable of single or split supply operation. These devices are designed to permit a common mode range-to-ground level with single supply operation. The function of the first operational amplifier is to provide a high impedance to the input signal ($V_{in}$). The voltage at the capacitor will follow the $V_{in}$ as long as $V_{in}$ increases (the voltage at the capacitor will equal the voltage $V_{in}$ minus the diode's voltage drop, 0.6 Volts). The diode will not allow for the voltage at the capacitor to decrease when $V_{in}$ decreases. Then, the capacitor will hold the $V_{in}$'s peak value minus 0.6 Volts. The second operational amplifier operates as a buffer providing a low output impedance to the peak-hold circuit. The $V_{in}$ is also connected to the comparator's positive input to be compared with the output of the peak-hold circuit. While $V_{in}$ increases, the voltage at the comparator's positive input will always be higher than the voltage at the comparator's negative input (VIN—0.6 Volts). This condition will generate a high voltage at the comparator's output. At some point, when $V_{in}$ decreases, the voltage at the comparator's positive input will be lower than the voltage at the negative input ($V_{in}$ MAX—0.6 Volts). When this happens, the comparators' output will switch from high to low, marking the time a high peak has been detected. This time is time $t_3$ in Equation 1. The capacitor needs to be discharged each time a cycle is completed. At this time, times $t_1$ and $t_3$ are known. Time $t_1$ is given by the trailing edge of the voltage in FIG. 7 while time $t_3$ is given by the signal out of the comparator. The clock is used to measure the time between $t_3$ and $t_1$. Time $t_3$-$t_2$ is measured by another oscillator. In an embodiment, the frequency in Equation 6 needs to be calculated to be high enough to generate at least 10,000 pulses between times $t_3$ and $t_1$. The number of pulses generated by the oscillator between times $t_3$ and $t_1$ are counted by a counter like the 74HCT163, a synchronous presettable 4-bit counter. In an embodiment, to be able to read over 10,000 pulses, one needs 14 bits. So, in an embodiment, the apparatus includes four 74HCT163 cascaded together in a ripple fashion. The clock signal is generated by a high frequency oscillator. The arithmetic circuit can be implemented with a microprocessor.

The preceding description of the disclosed embodiments is provided to enable any person skilled in the art to make or use the disclosed methods and systems. The foregoing method descriptions and the diagrams are provided as illustrative examples and are not intended to require or imply that the steps of the various embodiments must be performed in the order presented. As will be appreciated by one of ordinary skill in the art, the steps in the foregoing embodiments may be performed in any order. Words such as "then" are not intended to limit the order of the steps; these words are simply used to guide the reader through the description of the methods. The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the present disclosure.

Various modifications to these embodiments will be readily apparent to those skilled in the art, and the generic principles defined here may be applied to other embodiments without departing from the spirit or scope of the disclosure. Thus, the disclosure is not intended to be limited to the embodiments shown here but is to be accorded the widest scope consistent with the following claims and the principles and features disclosed herein.

What is claimed is:

1. A flow rate measurement apparatus, the apparatus comprising:
   a magnetization unit containing a first conduit for conveying a stream of a magnetizable fluid and an inductor arranged on an exterior surface of the first conduit and operable to magnetize fractions of magnetizable components present in the magnetizable fluid, the first conduit having a first magnetic permeability;
   a second conduit coupled downstream to the magnetization unit for conveying the stream of the magnetizable fluid containing magnetized fractions to a magnetic field detector, the second conduit having a second magnetic permeability;
   the magnetic field detector containing a third conduit for receiving the stream of the magnetizable fluid from the second conduit and a probe comprising a set of wires and placed inside the third conduit for detecting a magnetic field associated with the magnetized fractions of the magnetizable fluid, the third conduit having a third magnetic permeability; and
   a processing circuitry to determine velocity of the magnetizable fluid from time taken for the magnetized fractions to travel from the magnetization unit to the magnetic field detector and the distance between the magnetization unit and the magnetic field detector,
   wherein the second magnetic permeability is greater than that of the first magnetic permeability and the third magnetic permeability.

2. The flow rate measurement apparatus of claim 1, wherein flow rate measurement apparatus is coupled to a piping system for transport of the magnetizable fluid.

3. The flow rate measurement apparatus of claim 1, wherein the first conduit, the second conduit, and the third conduit are mechanically coupled to provide for an unobstructed flow of the magnetizable fluid.

4. The flow rate measurement apparatus of claim 1, wherein the magnetizable fluid is a hydrocarbon containing fluid.

5. The flow rate measurement apparatus of claim 4, wherein the magnetizable components are water and black powder.

6. The flow rate measurement apparatus of claim 1, wherein the magnetizable fluid is an aqueous fluid containing iron compounds.

7. A method for measuring flow rate of a magnetizable fluid flowing through a piping system, comprising:
   conveying a magnetizable fluid through a first conduit of a magnetization unit, the first conduit having a first magnetic permeability;
   applying, by the magnetization unit, a plurality of magnetic pulses at pre-determined intervals of time $t_0$ the magnetizable fluid to magnetize fractions of magnetizable components present in the magnetizable fluid;
   conveying the magnetizable fluid with the magnetized fractions from the magnetization unit through a second conduit to a magnetic field detector situated downstream of the magnetization unit at a prefixed distance, the second conduit having a second magnetic permeability;
   detecting a magnetic field from the magnetized fractions of the magnetizable fluid by the magnetic field detector placed in a third conduit having a third magnetic permeability;
   determining velocity of the magnetizable fluid by acquiring time taken for the magnetized fractions to travel from the magnetization unit to the magnetic field detector and the prefixed distance between the magnetization unit and the magnetic field detector; and
   calculating a flow rate of the magnetizable fluid from the velocity of the magnetizable fluid and cross-sectional area of the second conduit,
   wherein the second magnetic permeability is greater than that of the first magnetic permeability and the third magnetic permeability.

8. The method of claim 7, wherein the magnetizable fluid is an aqueous fluid containing iron compounds.

9. The method of claim 7, wherein the magnetizable fluid is a hydrocarbon containing fluid.

10. The method of claim 9, wherein the magnetizable components are water and black powder.

* * * * *